UNITED STATES PATENT OFFICE.

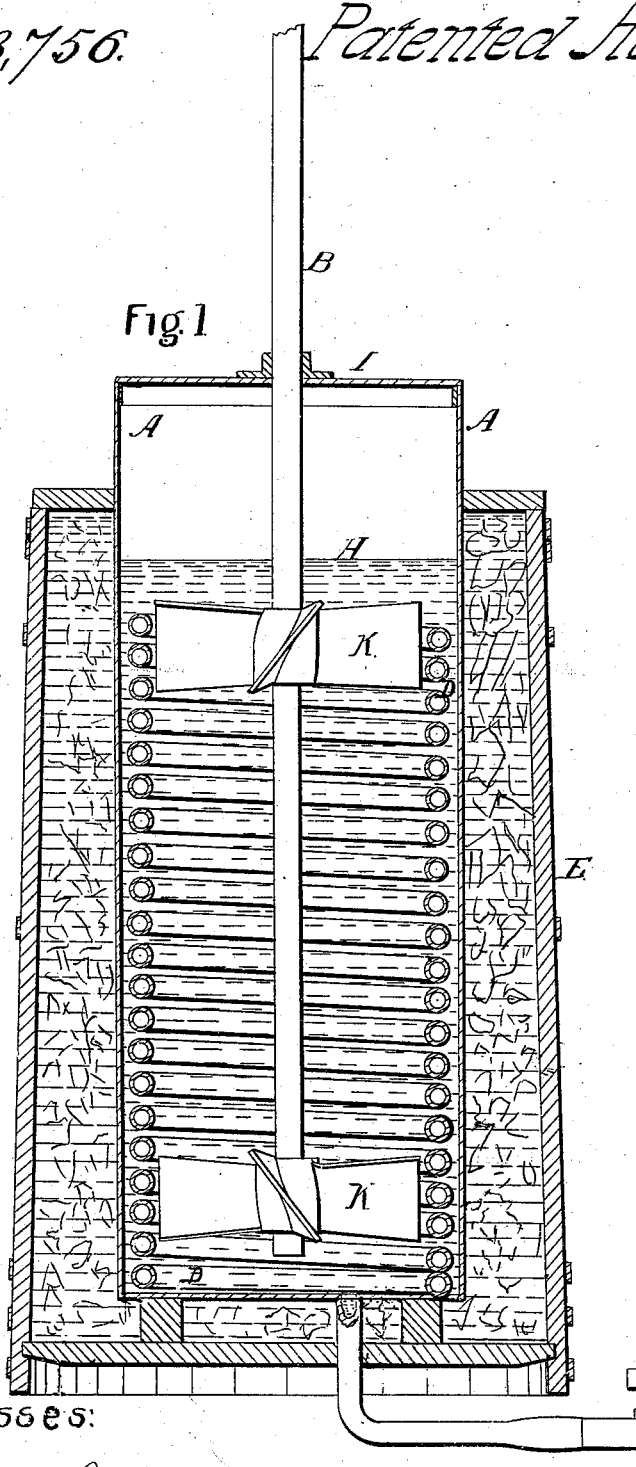

TALIAFERRO P. SHAFFNER, OF LOUISVILLE, KENTUCKY.

IMPROVEMENT IN THE MANUFACTURE OF NITRO-GLYCERINE.

Specification forming part of Letters Patent No. 93,756, dated August 17, 1869.

*To all whom it may concern:*

Be it known that I, TALIAFERRO P. SHAFFNER, of the city of Louisville, State of Kentucky, have made a new and useful invention or discovery in the manner and mode of Manufacturing Nitro-Glycerine; and I make the following description in order to enable one skilled in the arts to which it belongs to make and use the same, viz—

In preference, I use an iron tank, say, two feet in diameter and three feet high, with a pipe or tube at bottom closed by a faucet.

The accompanying drawing, Figure 1, will show the iron tank A, and the pipe and faucet F. I place this tank into a larger tank, made of wood, iron, or other material, (shown by E,) but about six inches shorter than tank A. Between the tanks A and E I place ice and salt, or cold water, in order to cool the iron tank. Inside of the iron tank I place a lead worm, D, for the purpose of conducting cold water fed from tanks above, or by force-pumps. From any known mechanical contrivance I suspend a rod, B, having fixed upon it flanges K K, placed so that when revolved it will produce an agitation of the liquid H, being mixed acids, one part nitric, and two parts sulphuric, in every desired direction, namely, taking it from the top to the bottom, and from the center to the sides, and from the sides to the center. These flanges K K are shaped somewhat like the propellor-wheel commonly used by vessels plying in water, the difference being that in the above arrangement they are so shaped and fitted to produce the desired effect. Through the cover I I introduce the glycerine, and, revolving the rod B, the flanges above mentioned will produce immediate mixing and cooling process, keeping the temperature very low in the tank, and more effectively and rapidly accomplished than any mode hitherto known.

Having thus described the process of manufacturing nitro-glycerine, being discovered and invented by me, sufficiently clear and distinct to enable one skilled in the arts to make and use the same, what I claim, and desire to secure by Letters Patent, is as follows:

1. The use of an outer tank, E, to cool the inner tank A, by means of ice or cold water contained therein, in combination as mentioned, substantially as and for the purposes described.

2. The agitator, being composed of a rod, having fixed upon it flanges, so bent and curved as, when revolved, will force the liquid from and to all points of the tank A, substantially as and for the purposes described.

TAL. P. SHAFFNER.

Witnesses:
 JAMES DEVEAU,
 W. M. SHAFFNER.